(12) United States Patent
White

(10) Patent No.: US 8,944,322 B2
(45) Date of Patent: Feb. 3, 2015

(54) TRI-OPTIC SCANNER

(75) Inventor: K. Lee White, Bentonville, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 79 days.

(21) Appl. No.: 13/183,607

(22) Filed: Jul. 15, 2011

(65) Prior Publication Data

US 2013/0015242 A1  Jan. 17, 2013

(51) Int. Cl.
*G06K 15/00* (2006.01)
*G06K 7/10* (2006.01)
*G07G 1/00* (2006.01)

(52) U.S. Cl.
CPC ........ *G06K 7/10554* (2013.01); *G06K 7/10722* (2013.01); *G06K 7/1096* (2013.01); *G07G 1/0045* (2013.01)
USPC .......................................... 235/383; 235/440

(58) Field of Classification Search
USPC .......... 235/440, 462, 14, 462.01–462.49, 383
See application file for complete search history.

(56) References Cited

U.S. PATENT DOCUMENTS

| | | | | |
|---|---|---|---|---|
| 5,801,370 | A  * | 9/1998 | Katoh et al. | 235/462.01 |
| 2002/0063159 | A1* | 5/2002 | Wilz et al. | 235/462.31 |
| 2003/0201326 | A1* | 10/2003 | Bobba et al. | 235/462.14 |
| 2008/0105747 | A1* | 5/2008 | Orlassino | 235/462.41 |
| 2010/0102130 | A1* | 4/2010 | Madej et al. | 235/462.42 |
| 2011/0309147 | A1* | 12/2011 | Barkan et al. | 235/440 |

* cited by examiner

Primary Examiner — Daniel Hess
(74) Attorney, Agent, or Firm — Fitch, Even, Tabin & Flannery, LLP

(57) ABSTRACT

A tri-optic scanner for checking out merchandise at stores includes first and second barcode scanners, and a third barcode scanner placed back-to-back to the second barcode scanner to face an opposite direction of the second barcode scanner. The tri-optic scanner is designed to allow the third barcode scanner to conveniently capture barcodes presented by a customer without a cashier touching barcode carriers that belong to the customer.

29 Claims, 9 Drawing Sheets

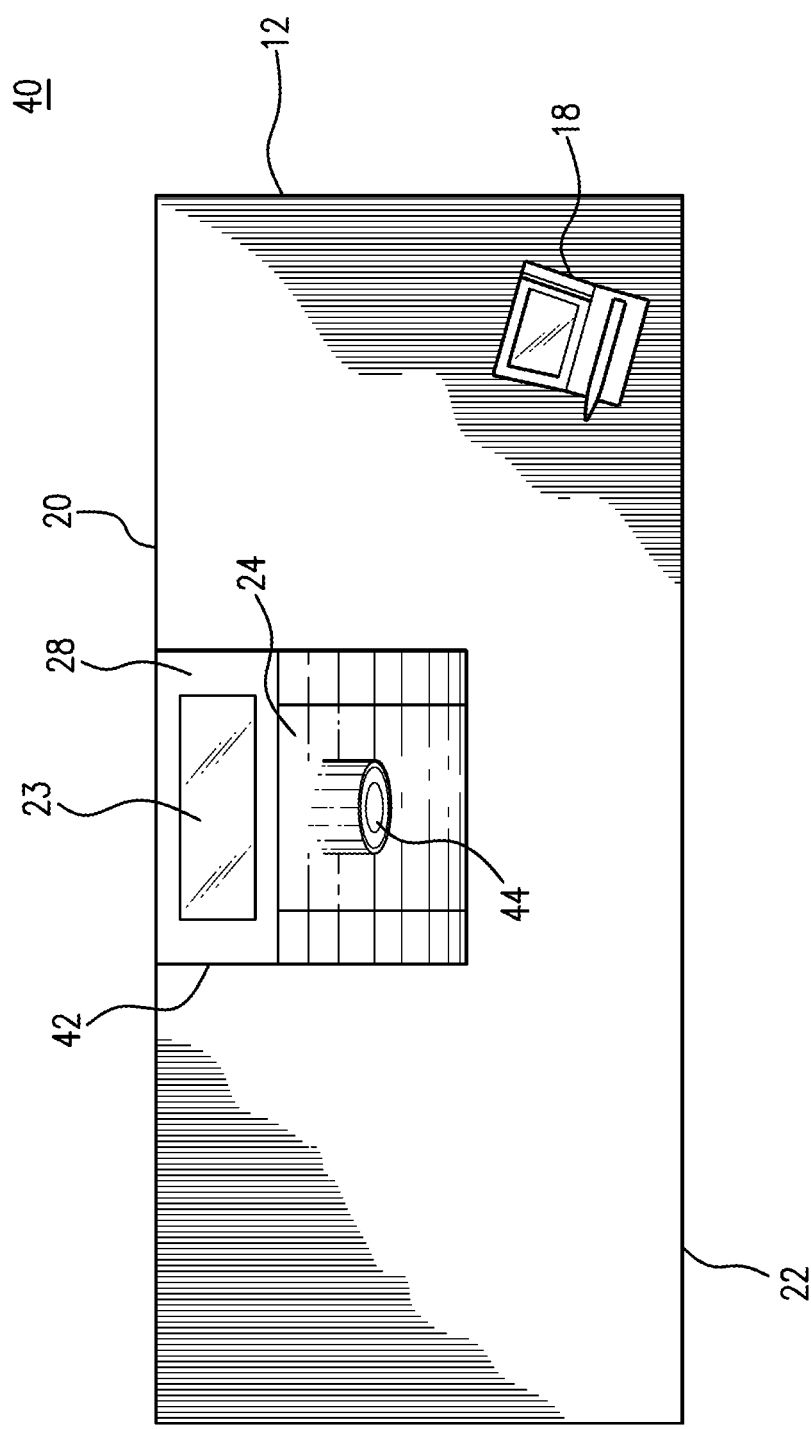

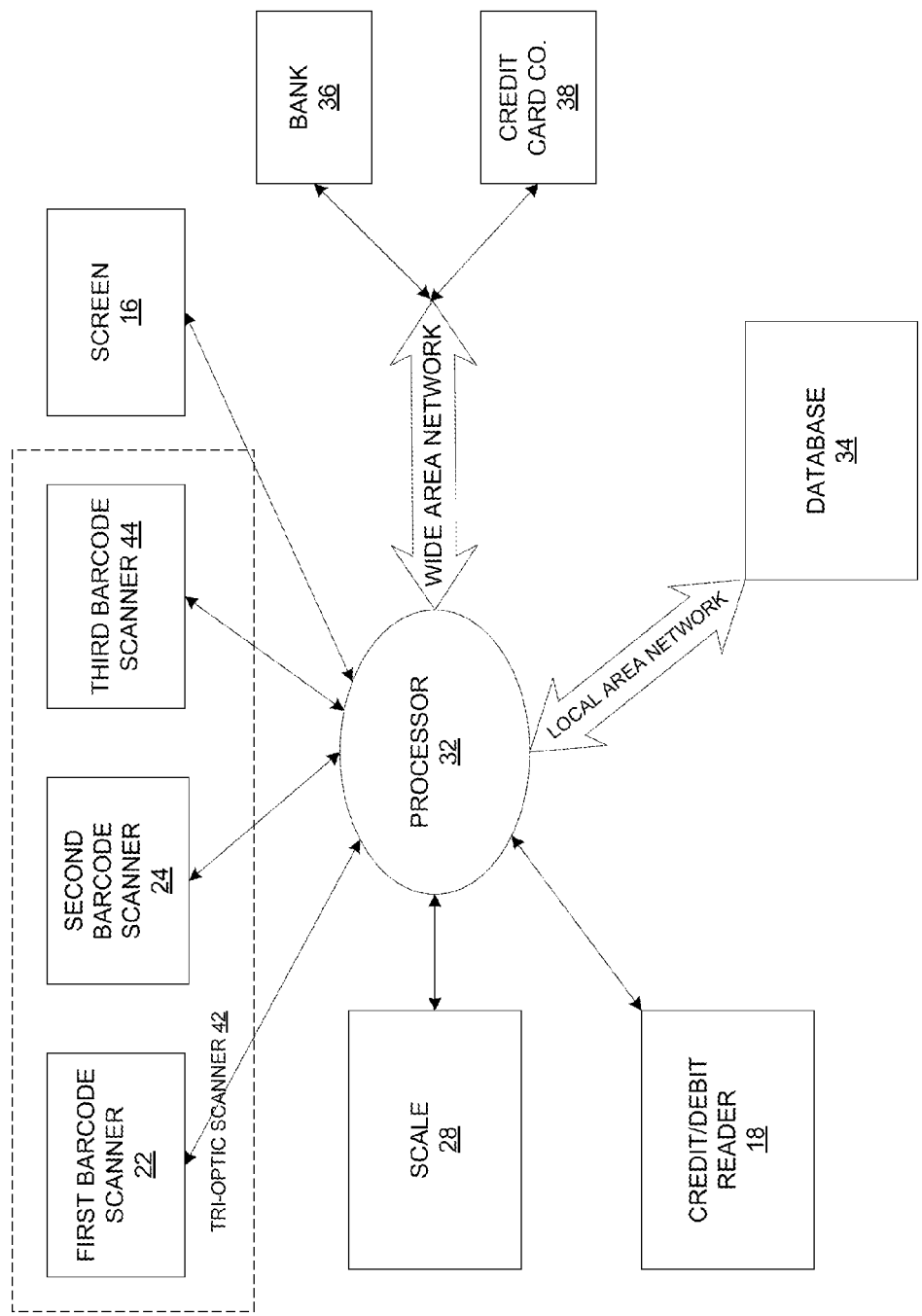

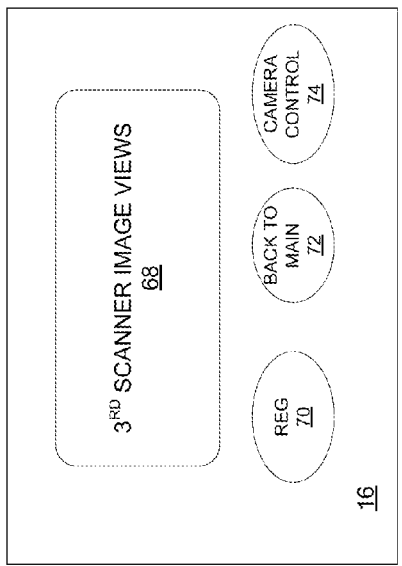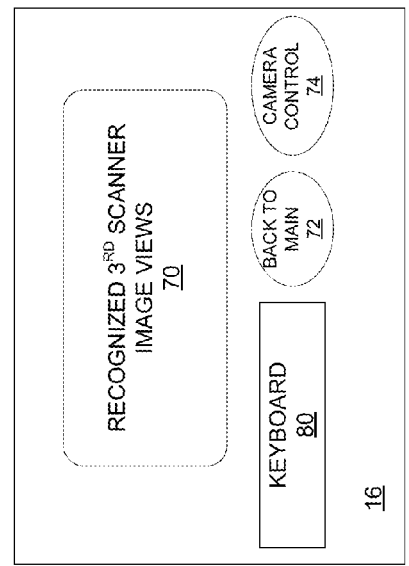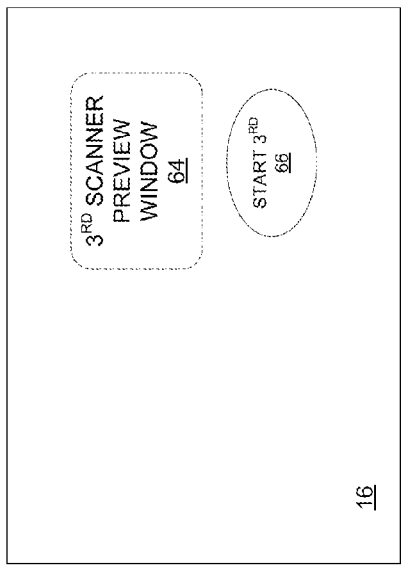
FIG. 7

TRI-OPTIC SCANNER

FIELD OF THE INVENTION

The present invention is generally directed to an apparatus and method for a point-of-sale (POS) system. In particular, the present invention is directed to an apparatus and method for a POS system that includes a tri-optic or multi-optic scanner for improved sale transactions between cashiers and customers.

BRIEF DESCRIPTION OF THE DRAWINGS

FIGS. 4A-4C illustrate three views of a POS station that includes a tri-optic scanner according to an embodiment of the present invention.
FIG. 5 is a system diagram of a POS system that includes a tri-optic scanner according to an embodiment of the present invention.
FIG. 7 illustrates a plurality of user interfaces for operating a tri-optic scanner according to an exemplary embodiment of the present invention.

DETAILED DESCRIPTION OF EXAMPLE EMBODIMENTS

Figure 1:
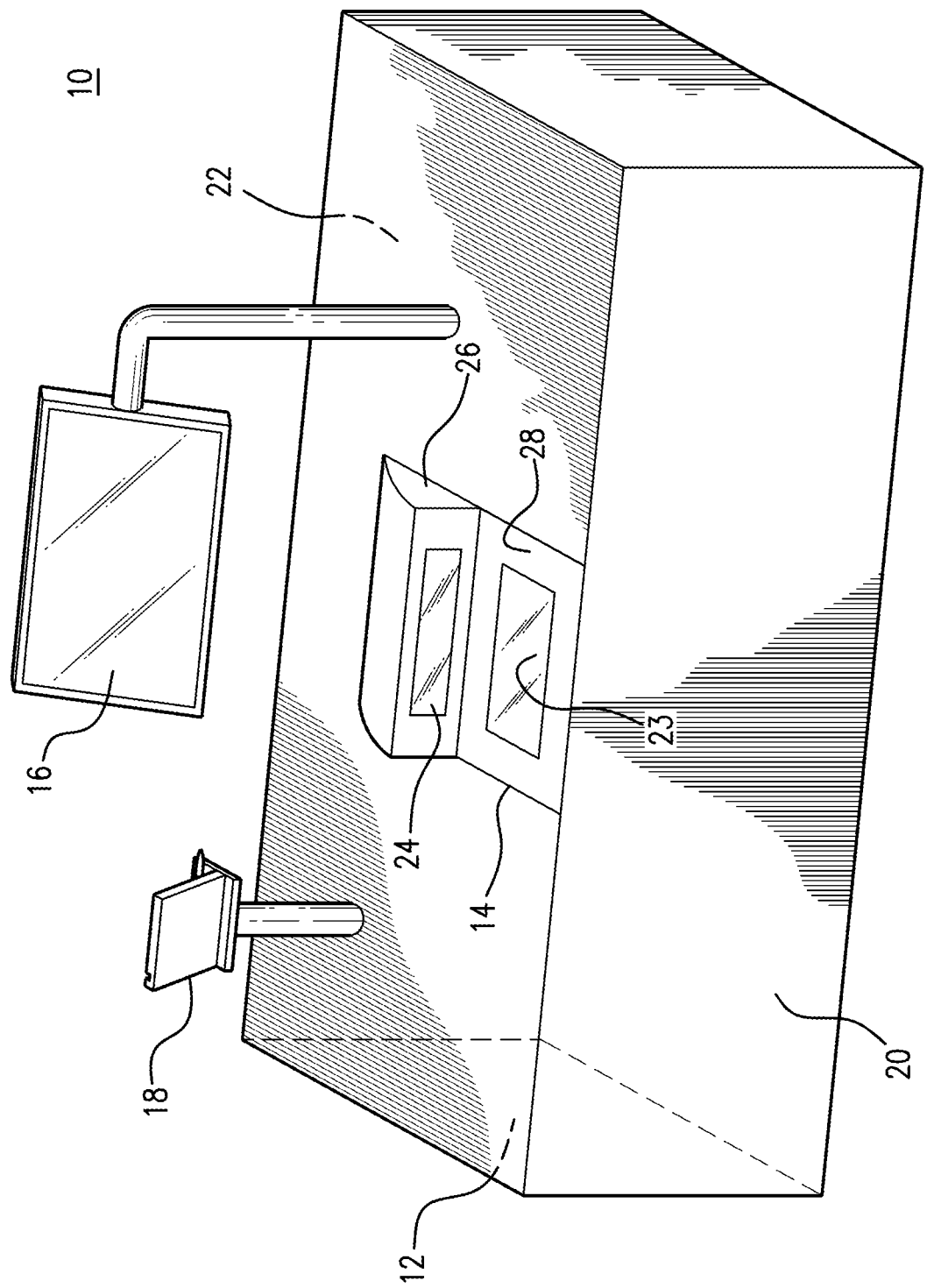
FIG. 1 illustrates a point-of-sale (POS) station.

In retail establishments, sales to customers normally take place at point-of-sale (POS) stations located on the premise. FIG. 1 is a diagram of a simplified POS station 10 commonly used for sales transactions. The POS station 10 includes a base platform 12, a bi-optic scanner 14, a display screen 16, and a credit/debit card reader 18. The POS station 10 may include other components such as cash drawers or cabinet storages that are not shown for the clarity of illustration.

The base platform 12 may include a first side 20 and a second side 22. In a cashier-assisted checkout, the cashier may be situated at the first side 20 and customers may proceed with checking out from the second side 22 of the base platform 12. The bi-optic scanner 14 may be integrated with the base platform 12 so that it is within the reach of the cashier. As commonly known to a person of ordinary skill in the art, the bi-optic scanner 14 may include a first barcode scanner 23 and a second barcode scanner 24. The barcode scanners 23, 24 may be of the types that are known suitable for scanning barcodes and may include laser barcode scanners or camera-based barcode scanners. Commonly, the bi-optic scanner may include two laser scanners for their reliability. For example, the first barcode scanner 23 may be a first laser scanner with its laser beams shining substantially upwards (or substantially vertical to a top surface of the base platform 12) through a first piece of glass placed horizontally to a top surface of the base platform 12 and the second barcode scanner 24 may be a second laser scanner with its laser beams shining substantially parallel to the top surface of the base platform 12 through a second piece of glass that is placed vertically to the top surface. The second barcode scanner 24 may be housed at least partially in a bonnet 26 situated on top of the base platform 12. The first barcode scanner 23 may also be dubbed as a scale 28 for weighing the weight of merchandise that is sold by weight. The display screen 16 may be a commonly-known touch screen with the screen oriented toward the cashier on which transaction results including those intermediate results such as the scan of each item are displayed. Further, the cashier may also issue commands through actionable elements such as icons displayed on the display screen 16. Finally, the credit/debit card reader 18 is situated on a swivel which may be rotated to face the customer or the cashier so that a sale transaction may be completed with a charge to the customer's credit or bank account.

Figure 2:
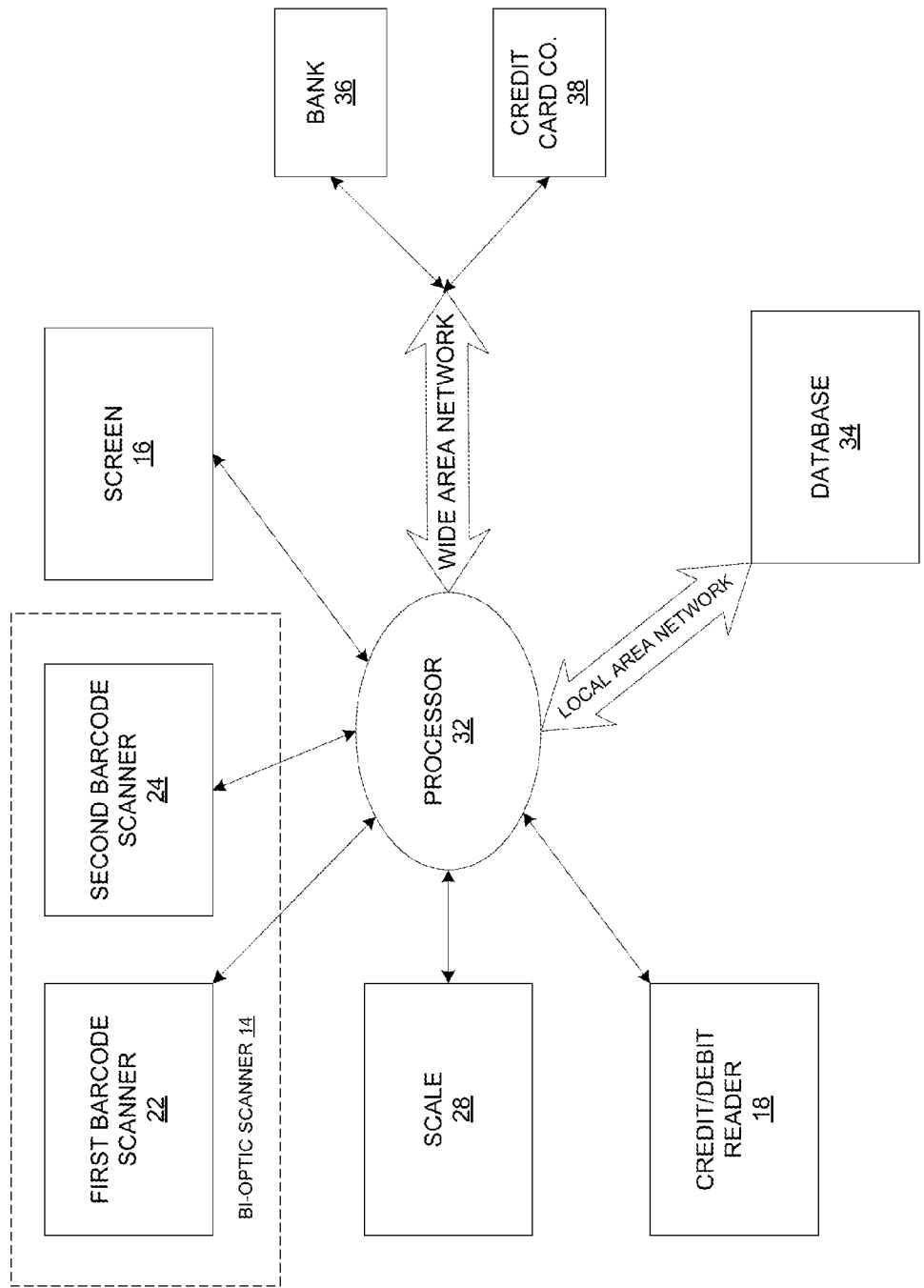
FIG. 2 is a system diagram of a POS system.

Bi-optic scanner 14, display screen 16, and credit/debit reader 18 may be interconnected through a network and work collaboratively via a processor to form a POS system 30. FIG. 2 shows a POS system 30 including these components. As shown in FIG. 2, the POS system 30 may include a processor 32 that is communicatively connected to bi-optic scanner 14 (including first barcode scanner 23, second barcode scanner 24, and scale 28), display screen 16, and credit/debit reader 18. Further, the processor 32 may be connected to a database 34 via a local area network (LAN), where data relating to inventory may be stored. Additionally, processor 32 may have access to a wide area network (WAN) through which the processor 32 may be connected to banks 36 and credit card issuers 38 so that a customer may receive onsite approval of the transaction.

In the event of a customer checkout, the customer may bring the merchandise that he intends to purchase to the POS station 10. Each merchandise may have already been associated with a barcode. For example, the barcode may be printed on a label that is attached to the merchandise. Additionally, the customer may have store-issued membership card (for member-only club stores) or discount card which may also include barcode identifications to associate the customer to a customer account. Finally, the customer may have coupons that may also include barcodes to apply discounts to the sale transaction. The cashier may start the transaction by scanning the membership card or the discount card to establish the customer's identification and associate the same with an existing account stored in database 34. Subsequently, the cashier may scan each merchandise to be purchased by the customer. Since bi-optic scanner 14 includes both vertical and horizontal laser beams, a barcode may be captured conveniently when it faces down toward the first barcode scanner 23 or faces side way toward the second barcode scanner 24. The captured barcode may be transmitted to the processor 32 which may be configured to record the merchandise corresponding to the barcode in a list as an item to be checked out. After the cashier scans all of the items for the customer, the cashier may scan customer's coupons for further discounts towards the final purchase price. After counting for all items and discounts for a final purchase price, the customer may pay for the purchase with cash or cash equivalents such as a debit/credit card through the debit/credit reader 18. The POS system 30 may complete the transaction by issuing a receipt to the customer and accounting the checked-out merchandise in the inventory database.

Figure 3:
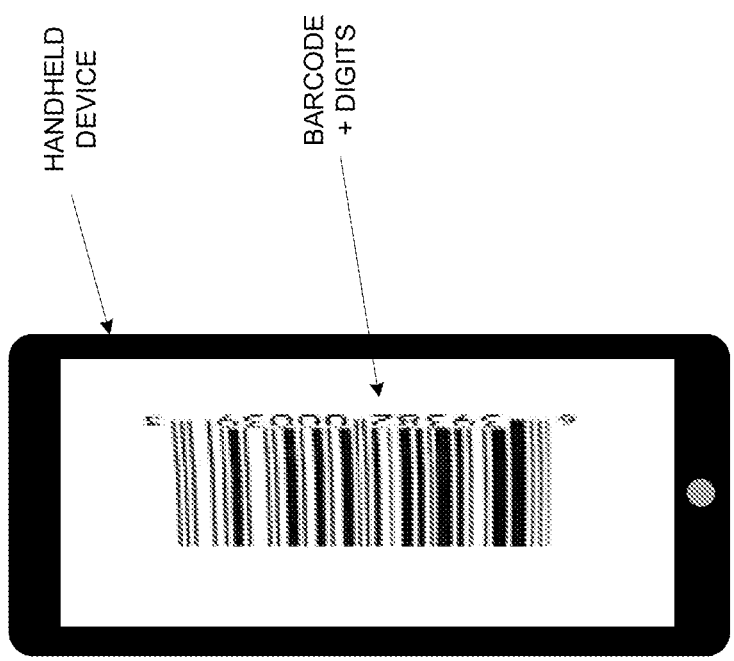
FIG. 3 illustrates a handheld device screen displaying barcodes.

The bi-optic scanner 14 as shown in FIG. 1 is commonly situated near the first side of the POS station 10 within an easy reach of the cashier. Traditionally, the customer may need to hand over barcode carriers such as the membership card, or discount card, or paper coupons to the cashier so that the cashier may scan them on the bi-optic scanner. The exchange of barcode carriers between the customer and cashier may prolong the checkout process. Moreover, with the emergence of smart handheld devices such as smart phones or portable media players that have large displays and/or Internet connections, the customer may store the barcodes of his membership card or store discount card in electronic form on the handheld devices. Further, the customer may receive coupons in electronic forms as well. Thus, all of the barcodes for customer's membership cards, store discount card, and coupons may be conveniently stored in one smart handheld device. FIG. 3 illustrates an exemplary handheld device displaying a barcode and corresponding digits of the barcode. Although it is convenient for the customer to consolidate all of these barcodes in a handheld device, barcodes displayed on the handheld device create challenges for the checkout process. First, the customer may need to hand over the expensive handheld device to the cashier for the cashier to scan or enter barcodes. The handover of the expensive handheld device to the cashier may create risk that the device may be damaged during the handover or while in the possession of the cashier, which may expose retailers to unwanted liabilities. Alternatively, instead of handing over the handheld device, the cashier may ask the customer to read out the barcodes for the cashier to manually enter into the POS system. However, this alternative very likely delays the checkout process and degrades the customer's shopping experience. Another issue is that handheld devices usually have LCD or similar screens. When bi-optic scanner 14 includes laser scanners, the laser scanners cannot, or cannot reliably, capture barcodes displayed on LCD screens.

Therefore, there a need for improving existing POS systems so that the POS systems may safely and conveniently capture barcodes stored in customer's personal handheld devices.

It is an objective of the present invention to provide customers who are checking out at a POS station with a customer-facing scanner so that the customers themselves can scan the barcodes displayed on their handheld devices without handing over the devices to the cashier. It is a further objective of the present invention that the customer-facing scanner is capable of reliably capturing barcode displayed on screens of the customer's handheld devices. It is a further objective of the present invention to integrate the customer-facing scanner with a bi-optic scanner to form a single tri-optic scanner without physically changing the POS station configuration.

Embodiments of the present invention may include a tri-optic scanner for scanning barcodes. The tri-optic scanner may include a first barcode scanner, a second barcode scanner a third camera-based scanner situated back-to-back to the second barcode scanner to face an opposite direction of the second barcode scanner.

Embodiments of the present invention may include a point-of-sale (POS) station to be deployed in stores. The POS station may include a tri-optic scanner for scanning barcodes. The tri-optic scanner may include a first barcode scanner, a second barcode scanner, and a third camera-based scanner situated back-to-back to the second barcode scanner to face an opposite direction of the second barcode scanner.

Embodiments of the present invention may include a point-of-sale (POS) station to be deployed in stores. The POS station may include a base platform having a first side at which a cashier operates and a second side at which a customer operates and a tri-optic scanner for scanning barcodes. The tri-optic scanner may further include a first barcode scanner, a second barcode scanner having laser beam substantially oriented toward the first side, and a third scanner backing to the second barcode scanner toward the second side of the base platform.

Embodiments of the present invention may include a method for checking out merchandise at a point-of-sale (POS) station. The POS station may include a tri-optic scanner that may include first and second barcode scanners, and a third camera-based scanner backing to the second barcode scanner to face an opposite direction. The method may include responsive to a trigger, activating a camera in the third camera-based scanner to capture at least one frame of image; responsive to receiving the captured at least one frame of image, performing barcode recognition on the captured at least one frame of image; and recording a recognized barcode in a memory storage.

Figure 4A:
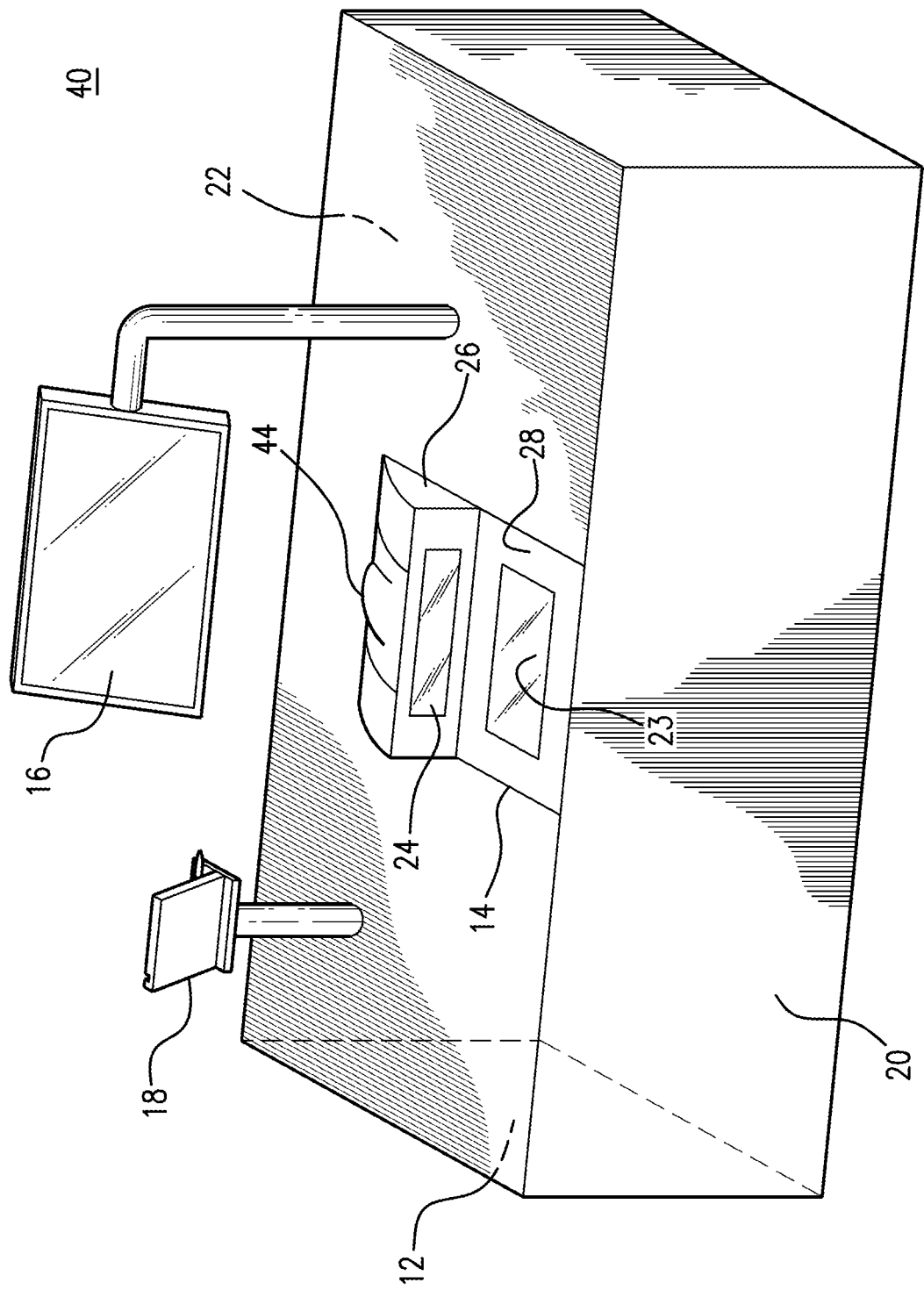
Figure 4B:
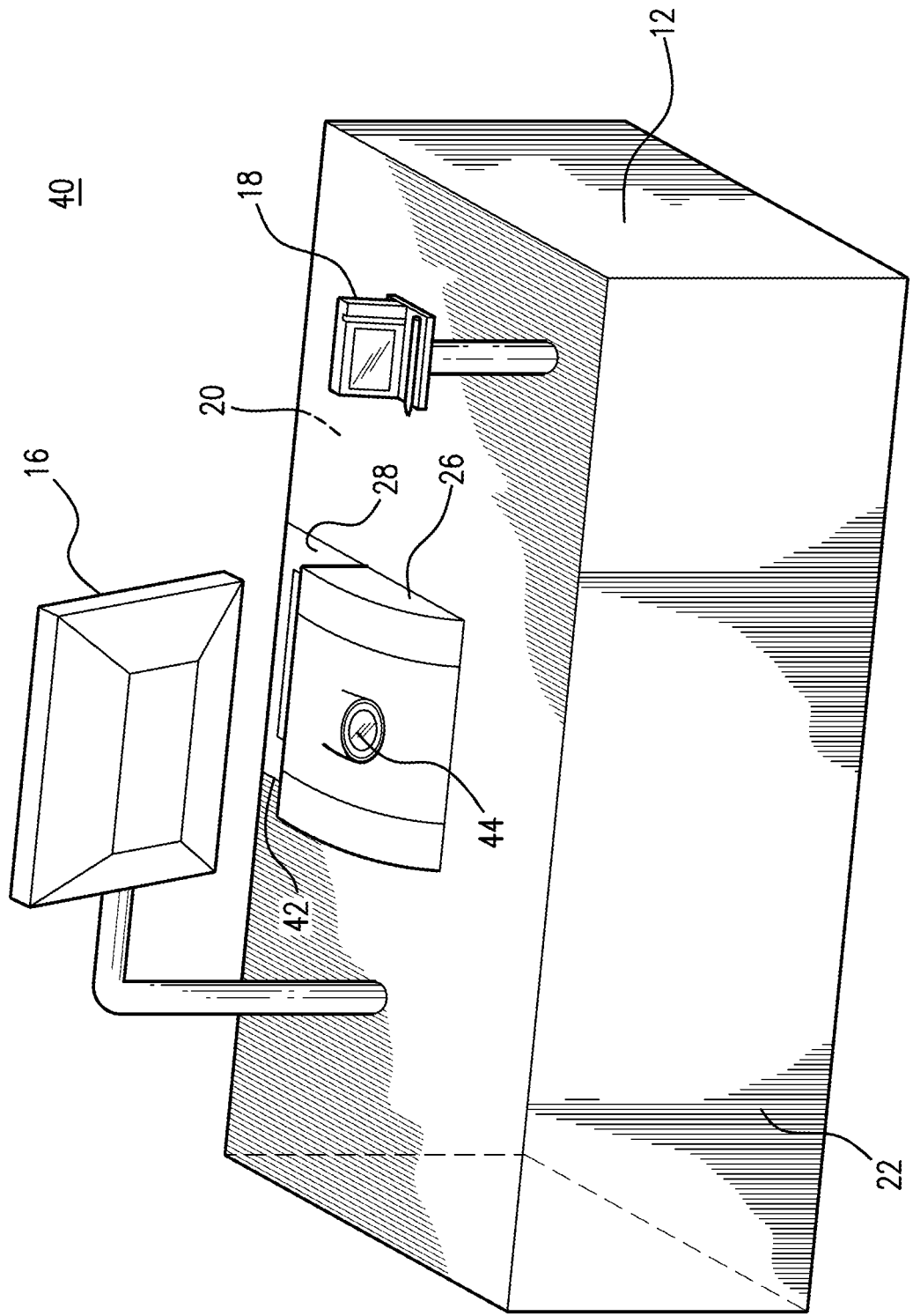

FIGS. 4A to 4C illustrate three views of a POS station 40 that includes a tri-optic scanner according to an embodiment of the present invention. FIGS. 4A to 4C correspond respectively to front, back, and top views (with display screen 16 omitted in the top view for clarity) of POS station 40. The POS station 40 as shown in FIGS. 4A to 4C may include a base platform 12, a display screen 16, and a credit/debit reader 18 similarly situated and configured as in FIG. 2. The similarly situated and configured base platform 12, display screen 16, and credit/debit reader 18 may perform same or substantially the same functions.

The POS station 40 may further include a tri-optic scanner 42 in place of the bi-optic scanner 14 of FIG. 1. The tri-optic scanner may include the first barcode scanner 23 and second barcode scanner 24 similar to bi-optic scanners. Additionally, the tri-optic scanner 42 may include a third barcode scanner 44 facing in a substantially opposite direction from the second barcode scanner 24. Thus, the three barcode scanners may allow barcodes to be scanned from both sides of the base platform 12. In an exemplary embodiment, the first and second barcode scanners may be laser scanners, and the third barcode scanner may be a camera-based scanner.

In an exemplary embodiment of the present invention, tri-optic scanner 42 may be integrated with the base platform 12 in a way similar to the bi-optic scanner 14 being integrated to the base platform 12. Tri-optic scanner 42 may include a first barcode scanner 23 with a primary optical axis substantially upwards (or substantially vertical to a top surface of the base platform 12) through a first piece of glass placed horizontally to a top surface of the base platform 12 and a second barcode scanner 24 with a primary optical axis substantially parallel to the top surface of the base platform 12 through a second piece of glass that is placed vertically to the top surface. For laser scanners, the primary optical axis may be the direction that laser beams shine; for camera-based scanners, the primary optical axis may be the optical axis of the camera. The second barcode scanner 24 may be housed at least partially in the bonnet 26 situated on top of the base platform 12. Both the first and second barcode scanners 23, 24 may face the first side of the base platform where a cashier is normally situated. The third barcode scanner 44 may face the opposite direction of the second barcode scanner 24 toward the second side of the base platform 12 so that customers at the second side may use the third barcode scanner to scan barcodes (including those displayed on a handheld device) without handing over barcode carriers to the cashier.

In an exemplary embodiment of the present invention, the third barcode scanner may be integrated with the first and second barcode scanners to form a single stationary tri-optic scanner. The third barcode scanner 44 may be situated in the bonnet 26 along with the second barcode scanner. In this way, the tri-optic scanner 44 may occupy substantially the same physical dimension as the bi-optic scanner 14. The bonnet 26 may include an opening on the side near the second side of the base platform 12. The opening may be covered by transparent materials such as glass, or alternatively, uncovered so that the third barcode scanner 44 may capture barcodes through the opening. Alternatively, the third barcode scanner 44 may be placed at a suitable location facing the side of customers or within easy reach of the customer. For example, the third barcode scanner 44 may be placed outside the bonnet 26 to achieve such objective.

In an exemplary embodiment of the present invention, the third barcode scanner 44 may be an imager that includes a camera-based barcode scanner. Unlike laser scanners, optical cameras may robustly capture images displayed on screens of handheld devices. The camera-based barcode scanner may capture two-dimensional images based on which a processor configured with image processing and analysis modules may be executed to recognize barcodes displayed on these two-dimensional images. In one embodiment, the camera may be a video camera that may be configured to capture a sequence of images. In another embodiment, the camera may be a high resolution still image sensor that may be triggered to capture a frame of high resolution image. To improve the quality of captured images, a light source (not shown) such as LED illumination may be coupled to the camera and work collaboratively with the camera. In alternative embodiments, the third barcode scanner 44 may be other types of barcode scanners. For example, the third barcode scanner 44 may be a CCD reader or an omni-directional barcode scanner or even a laser scanner.

Tri-optic scanner 42, display screen 16, and credit/debit reader 18 may be interconnected through a network and work collaboratively via a processor 32 to form a POS system 46. FIG. 5 shows a POS system 46 including a tri-optic scanner 42 according to an exemplary embodiment of the present invention. Similar to the POS system 30 as shown in FIG. 2, the POS system 46 may include a processor 32 that is communicatively connected to tri-optic scanner 42 (including first barcode scanner 23, second barcode scanner 24, third barcode scanner 44, and scale 28), display screen 16, and credit/debit reader 18. Further, the processor 32 may be connected to a database 34, via a local area network (LAN), where data relating to inventory may be stored. Additionally, processor 32 may have access to a wide area network (WAN) through which the processor 32 may be connected to banks 36 and credit card issuers 38 so that a customer may receive onsite approval of the transaction.

In an exemplary embodiment of the present invention, the first and second barcode scanners 23, 24 may be continuously activated during a customer checkout process, while the third barcode scanner 44 may be activated to perform barcode recognition only in response to a triggering event. For example, the barcode recognition process may be triggered by the cashier activating a button displayed on the touch display screen 16 or a hardware switch that controls the camera. In an alternative exemplary embodiment, the third barcode scanner 44 may be continuously operating in a monitoring mode, and the barcode recognition process may be automatically triggered by detection of an event such as the detection of an object near an optical lens of the camera of the third barcode scanner 44.

Figure 6:
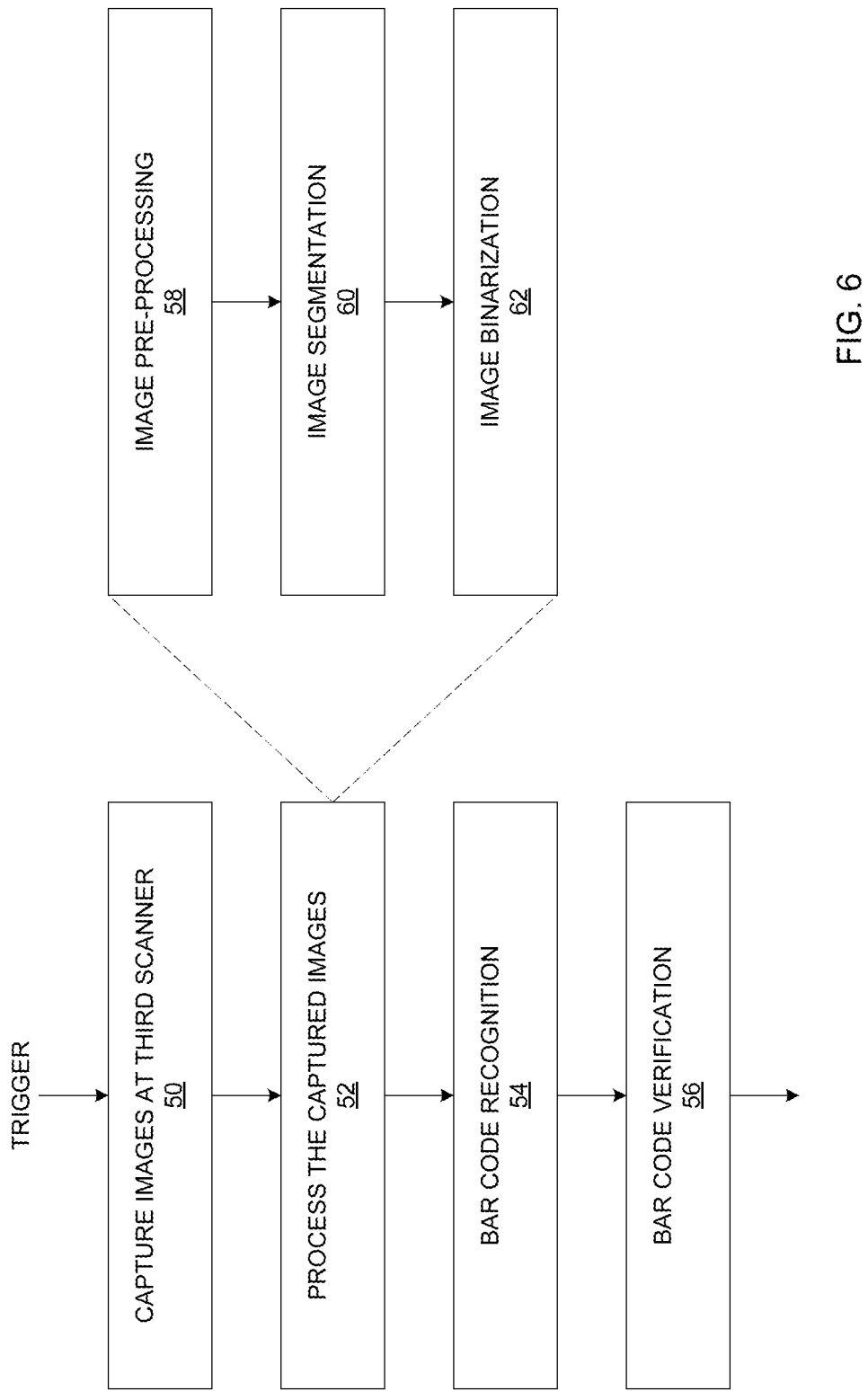
FIG. 6 illustrates a method for recognizing barcodes using a tri-optic scanner according to an exemplary embodiment of the present invention.

In response to the trigger, processor 32 of POS system 40 may be configured to perform barcode recognition. FIG. 6 shows a process for barcode recognition using a tri-optic scanner according to an exemplary embodiment of the present invention. In response to a triggering event (e.g., an explicit instruction by the cashier or an automatic detection of the occurrence of an event), at step 50, processor 32 may send a commend to the camera-based scanner to trigger the camera-based scanner to capture one or more frames of images. Each frame of images may include an array of light intensive values sensed by an array sensor. In one exemplary embodiment, the array sensor may include an M by N array of sensing elements, where M and N are both positive integers. Each sensing element may have L bits to indicate the light intensity (or grey level) sensed by the sensing element, where L is a positive integer. Alternatively, each sensing element may include sub-elements for detecting intensities of different colors. The captured image frames may be transmitted to and stored in a storage such as a memory device. In response to the captured frames, processor 32 may execute an image processing module 52 to perform image processing on the stored frames of images. For example, the image processing module 52 may include a pre-processing module 58, an image segmentation module 60, and/or an image binarization module 62. The pre-processing module 58 may include filtering operations that remove noise and artifacts such as blurs. The image segmentation module may segment a frame of image into regions that include background regions and regions of interests—or those candidate regions for barcodes. Thus, each one frame of images may include one or more regions of interest, each including one or more barcode candidates. The image segmentation may be based on colors, textures, and/or motions of objects. The optional image binarization module 62 may perform threshold operations including masking out background regions. Further, the binarization module 62 may convert the processed grey level images or color images into 1-bit black and white images.

Based on the processed image frames, processor 32 may execute a barcode recognition module 54 that may identify barcodes. The barcode recognition module 54 may be an image-based barcode recognizer that is known to a person of ordinary skill in the art. In addition to recognizing barcodes, the barcode recognition module 54 may also recognize digits (as shown in FIG. 3) printed as part of the barcodes. These digits are designed to help a cashier manually ascertain the barcode in the event that the automatic barcode recognizer cannot recognize the displayed barcodes. If the barcode recognition module 54 recognizes one or more barcodes, processor 32 may optionally execute a barcode verification module 56 to confirm these barcodes. In one exemplary embodiment, the recognized barcodes may be displayed on the screen for the cashier to manually confirm the barcodes. Alternatively, the verification may be based on comparing a calculated confidence score to a predetermined threshold. The recognized barcodes may be considered verified if the calculated confidence score is greater than the predetermined threshold. The confidence score may be calculated based on a statistical model used for barcode recognition.

If the third barcode scanner 44 is a camera-based scanner such as a video camera, the camera may operate in a number of graphic user interface (GUI) modes in conjunction with the display screen 16 for enhancing the check out process. FIG. 7 shows GUI modes of the third scanner 44 as displayed on display screen 16 according to an exemplary embodiment of the present invention. At Screen One before the third barcode scanner 44 is activated for barcode recognition, the processor 32 may display on the display screen 16 a control 66 that, when activated, may trigger an onset of a barcode recognition process.

When there is a need to recognize barcodes on the third scanner, a cashier may activate control 66 to switch from Screen One to Screen Two which may display a high resolution scanner image view 68 along with a first set of controls. The scanner image view 68 of Screen Two may include more pixels than the preview window 64 for the ease to visually ascertain barcodes by the cashier. The first set of controls may include a recognition control 70, a back to main page control 72, and a camera control 74. Activation of the recognition control 70 may cause the barcode recognition process as illustrated in FIG. 6 to start. Activation of the back to main page control 72 may switch back to Screen One and effectively stop the barcode recognition process. Activation of the camera control 74 may bring up a further panel that brings up specific controls for operating the camera such as zooming in/out, tilting, and panning the optical lens of the camera. The cashier may manipulate the camera using these specific controls to initially locate regions having barcodes.

When the barcode recognition process is completed, the recognition results may be displayed on Screen Three which may include a recognized image view 70, and a second set of controls. The recognized image view 70 may include displays of barcode recognition results. In one exemplary embodiment, the recognized results may be rendered on display screen 16 near the corresponding barcodes so that the recognized results may be visually compared to the digits of the barcodes. The second set of controls may include a confirm control 76, a manual entry control 78, and the same back to main page control 72 and camera control 74. Based on the displays of barcode recognition results, the cashier may activate the confirm control 76 to accept the recognized barcodes. However, if the barcode recognition module does not result in a correct or recognizable barcodes, the cashier may activate the manual entry control 78 to enter the digits associated with the barcode based on the visual display in the recognized image view 70. In one exemplary embodiment, the activation of the manual entry control 78 may cause a switch from Screen Three to Screen Four that may include a keyboard 80 through which the cashier may manually enter barcodes through a touch screen.

The customer checkout process at POS station 40 may be similar to that at POS station 30. However, in the event of a customer producing barcodes displayed on a handheld device, the cashier may direct the customer to place the handheld device in front of the third barcode scanner 44. The cashier may then activate a barcode recognition module to detect and recognize barcodes displayed on the handheld device. Upon confirming and accepting recognized barcodes, these barcodes may be entered into a record of the customer for the completion of a customer checkout.

A video camera of the third barcode scanner 44 may be additionally used for theft prevention and object identification. For example, the video camera may be dubbed as a surveillance monitor that may display on a preview window 64 traffic passing through the second side of the POS station 40 so as to monitor items on the lower portion of a shopping cart to prevent un-scanned items from passing through the POS station. The preview window 64 may display a sequence of low resolution images to save computer resources. Further, processor 32 may execute an object recognition module to identify objects in the camera images.

While the present invention may be discussed in light of a tri-optic scanner that includes three barcode scanners, other embodiments may also reflect principles of the present invention. For example, in one embodiment of the present invention, a multi-optic scanner may include a pair of first and second stationary barcode scanners, in which the first stationary barcode scanner may operate continuously for a cashier to scan barcodes of merchandise, and the second stationary barcode scanner may operate selectively in response to a trigger for a customer to scan barcodes. In one embodiment, the first and second stationary barcode scanners may be situated back-to-back on a POS station to face opposite directions. The multi-optic scanner may include a third stationary barcode scanner that may be placed in conjunction with the first barcode scanner to form a single scanning space and operate continuously with the first stationary barcode scanner to capture barcodes of merchandise.

In another embodiment of the present invention, a multi-optic scanner may include first and second barcode scanners, in which when the multi-optic scanner is placed on a platform of a point-of-sale (POS) station, the first barcode scanner may be situated at a first side of the platform to allow a cashier to scan barcodes on the first barcode scanner, and the second barcode scanner may be situated at a second side of the platform to selectively allow a customer to scan the barcodes on the second barcode scanner.

Those skilled in the art may appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, and specification.

What is claimed is:

1. A tri-optic scanner for scanning barcodes, comprising:
a first barcode scanner;
a second barcode scanner configured to face a cashier location when the tri-optic scanner is situated on a base platform of a point-of-sale (POS) station; and
a third selectively-activated camera-based scanner situated back-to-back to the second barcode scanner and configured to face a customer location when the tri-optic scanner is situated on the base platform of the POS station and in a substantially opposite direction than the second barcode scanner, the second barcode scanner and third selectively-activated camera-based scanner each having a substantially horizontal optical axis;
a display screen; and
a processor,
wherein
the first and second barcode scanners continuously operate to capture barcodes, while the third camera-based scanner is deactivated,
responsive to a trigger that is automatically generated in response to a detection of an object near an optical lens of the third camera-based scanner and in the customer location, the third camera-based scanner is selectively activated to capture at least one frame of image provided by a customer,
the third selectively activated camera-based scanner includes a video camera, and the display screen displays a window showing traffic passing through the customer location, and
the processor is configured to execute an object recognition module to recognize objects in the traffic passing through the customer location.

2. The tri-optic scanner of claim 1, wherein the first barcode scanner, the second barcode scanner, and the third camera-based scanner are communicatively connected to the processor that is adapted to perform barcode recognition.

3. The tri-optic scanner of claim 1, wherein the first barcode scanner is a first laser scanner and the second barcode scanner is a second laser scanner, and wherein when the tri-optic scanner is placed on the base platform of the POS station, a laser beam of the first laser scanner faces substantially upwards, a laser beam of the second laser scanner faces substantially horizontally toward a first side of the base platform, and an optical lens of the third camera-based scanner faces substantially horizontally toward a second side of the base platform.

4. The tri-optic scanner of claim 1, wherein responsive to the trigger, the third camera-based scanner is activated to capture the at least one frame of image that is transmitted to the processor for recognizing barcodes in the captured at least one frame of image.

5. A point-of-sale (POS) station, comprising:
a tri-optic scanner for scanning barcodes, the tri-optic scanner including:
a first barcode scanner;
a second barcode scanner configured to face a cashier location; and
a third selectively-activated camera-based scanner situated back-to-back to the second barcode scanner to face a customer location and in an opposite direction than the second barcode scanner, the second barcode scanner and third selectively-activated camera-based scanner each having a substantially horizontal optical axis; and
a display screen oriented in substantially a same direction as the second barcode scanner; and
a processor,
wherein
the first and second barcode scanners continuously operate to capture barcodes, while the third camera-based scanner is deactivated,
responsive to a trigger that is automatically generated in response to a detection of an object near an optical lens of the third camera-based scanner and in the customer location, the third camera-based scanner is selectively activated to capture at least one frame of image provided by a customer,
the third camera-based scanner includes a video camera, and the display screen displays a window showing traffic passing through the customer location, and
the processor is configured to execute an object recognition module to recognize objects in the traffic passing through the customer location.

6. The POS station of claim 5,
wherein the processor is adapted to perform barcode recognition,
wherein the first barcode scanner, the second barcode scanner, and the third camera-based scanner are communicatively connected to the processor.

7. The POS station of claim 6, further comprising:
a base platform having a first side at which a cashier operates and a second side at which a customer operates,
wherein the display screen is communicatively connected to the processor for displaying results of a checkout.

8. The POS station of claim 7, wherein the display screen is a touch screen that displays controls for interacting with the third camera-based scanner.

9. The POS station of claim 5, the at least one frame of image is transmitted to the processor for recognizing barcodes in the captured at least one frame of image.

10. The POS station of claim 5, wherein the display screen displays a control that when activated triggers a barcode recognition process.

11. The POS station of claim 10, wherein when the barcode recognition process is complete, the display screen displays a barcode recognition result and a barcode image.

12. The POS station of claim 11, wherein the display screen displays a second control that when activated accepts the barcode recognition result.

13. The POS station of claim 11, wherein the display screen displays a third control that when activated displays on the display screen a manual entry mode enabling manual entry by a cashier of numerical digits corresponding to the displayed barcode image.

14. The POS station of claim 13, wherein the display screen displays a keyboard in the manual entry mode to enable the manual entry by the cashier of the numerical digits corresponding to the displayed barcode image.

15. A point-of-sale (POS) station, comprising:
a base platform having a first side at which a cashier operates in a cashier location and a second side at which a customer operates in a customer location;
a tri-optic scanner for scanning barcodes, the tri-optic scanner including:
a first barcode scanner;
a second barcode scanner facing substantially toward the first side and the cashier location; and
a third selectively-activated camera-based scanner backing to the second barcode scanner and facing toward the second side of the base platform and the customer location, the second barcode scanner and third selectively-activated camera-based scanner each having a substantially horizontal optical axis; and
a display screen oriented in substantially same direction as the second barcode scanner; and
a processor,
wherein
the first and second barcode scanners continuously operate to capture barcodes, while the third camera-based scanner is deactivated,
responsive to a trigger that is automatically generated in response to a detection of an object near an optical lens of the third camera-based scanner and in the customer location, the third camera-based scanner is selectively activated to capture at least one frame of image provided by a customer,
the third camera-based scanner includes a video camera, and the display screen displays a window showing traffic passing through the customer location, and
the processor is configured to execute an object recognition module to recognize objects in the traffic passing through the customer location.

16. The POS station of claim 15,
wherein the processor is adapted to perform barcode recognition,
wherein the first barcode scanner, the second barcode scanner, and the third barcode scanner are communicatively connected to the processor.

17. The POS station of claim 16, wherein the at least one frame of image is transmitted to the processor for barcode recognition.

18. A method for checking out merchandise at a point-of-sale (POS) station, wherein the POS station includes a tri-optic scanner that includes first and second barcode scanners, the second barcode scanner configured to face a cashier location; a third selectively-activated camera-based scanner backing to the second barcode scanner to face a customer location and in an opposite direction from that of the second barcode scanner, the second barcode scanner and third selectively-activated camera-based scanner each having a substantially horizontal optical axis; a processor; and a display screen oriented in substantially a same direction as the second barcode scanner, the method comprising:
responsive to a trigger automatically generated in response to a detection of an object near an optical lens of the third camera-based scanner and in the customer location, a camera in the third camera-based scanner to capture at least one frame of image;

responsive to receiving the captured at least one frame of image, performing, by the processor, barcode recognition on the captured at least one frame of image; and recording, by the processor, a recognized barcode in a memory storage, wherein the first and second barcode scanners continuously operate to capture barcodes, while the third camera-based scanner is deactivated, the third camera-based scanner being selectively activated in response to the trigger;

wherein the third camera-based scanner includes a video camera, the method further comprising:

displaying by the display screen a window showing traffic passing through the customer location; and executing, by the processor, an object recognition module to recognize objects in the traffic passing through the customer location.

19. The method of claim 18, further comprising:
responsive to receiving the captured at least one frame of image, performing, by the processor, pre-processing on the captured at least one frame of image.

20. The method of claim 18, further comprising:
responsive to receiving recognized barcodes, performing a verification on the recognized barcodes,
wherein the verification includes one of a manual confirmation and a manual correction by a cashier.

21. A multi-optic scanner, comprising:
a first stationary barcode scanner; and
a second stationary barcode scanner configured to face a customer location of a point-of-sale station,
wherein the first stationary barcode scanner operates continuously, while the second stationary barcode scanner is deactivated, and the second stationary barcode scanner operates selectively in response to a trigger that is automatically generated in response to a detection of an object near an optical lens of the second stationary barcode scanner and in the customer location, and
the second stationary barcode scanner performs at least one of zooming, tilting or panning of the optical lens in response to activation of a control on a display screen of a point-of-sale station.

22. The multi-optic scanner of claim 21, wherein the first and second stationary barcode scanners face opposite directions and each have a substantially horizontal optical axis.

23. The multi-optic scanner of claim 22, further comprising a third stationary barcode scanner that is placed in conjunction with the first stationary barcode scanner to form a scanning space and operates continuously to capture barcodes.

24. The multi-optic scanner of claim 23, wherein the first and third stationary barcode scanners are laser scanners, and the second stationary barcode scanner is a camera-based scanner.

25. The multi-optic scanner of claim 21, wherein the trigger is provided by the cashier in response to at least one of barcode displayed on handheld device of a customer.

26. The multi-optic scanner of claim 21,
wherein when the multi-optic scanner is placed on a platform of the point-of-sale (POS) station, the first barcode scanner is situated at a first side of the platform to allow a cashier to scan barcodes on the first barcode scanner, and the second barcode scanner is situated at a second side of the platform to selectively allow a customer to scan the barcodes on the second barcode scanner.

27. A point-of-sale (POS) station, comprising:
a tri-optic scanner for scanning barcodes, the tri-optic scanner including:
a first barcode scanner;
a second barcode scanner configured to face a cashier location; and
a third selectively-activated camera-based scanner situated back-to-back to the second barcode scanner to face a customer location and in an opposite direction than the second barcode scanner, the second barcode scanner and third selectively-activated camera-based scanner each having a substantially horizontal optical axis; and
a display screen oriented in substantially a same direction as the second barcode scanner,
wherein
the first and second barcode scanners continuously operate to capture barcodes, while the third camera-based scanner is deactivated,
responsive to a trigger that is automatically generated in response to a detection of an object near an optical lens of the third camera-based scanner and in the customer location, the third camera-based scanner is selectively activated to capture at least one frame of image provided by a customer, and
wherein the display screen displays a control that when activated performs at least one of zooming, tilting or panning of the optical lens of the third camera-based scanner.

28. A point-of-sale station, comprising:
a scanning system including:
a first barcode scanner;
a second barcode scanner; and
a third selectively-activated camera-based scanner situated back-to-back to the second barcode scanner to face a substantially opposite direction than the second barcode scanner; and
a display screen, wherein the display screen displays a control that when activated performs at least one of zooming, tilting or panning of the third camera-based scanner.

29. A point-of-sale station, comprising:
a scanning system including:
a first barcode scanner;
a second barcode scanner; and
a third selectively-activated camera-based scanner situated back-to-back to the second barcode scanner to face a substantially opposite direction than the second barcode scanner;
a display screen, wherein the display screen displays a window showing traffic passing through a customer location as captured by the third camera-based scanner; and
a processor to execute an object recognition module to recognize objects in the traffic passing through the customer location.

* * * * *